United States Patent [19]

Ferrero

[11] Patent Number: 4,725,445
[45] Date of Patent: Feb. 16, 1988

[54] ICE-CREAM CONFECTIONERY PRODUCT AND A METHOD FOR ITS MANUFACTURE

[75] Inventor: Pietro Ferrero, Brussels, Belgium
[73] Assignee: Ferrero S.p.A., Alba, Italy
[21] Appl. No.: 866,078
[22] PCT Filed: Sep. 4, 1985
[86] PCT No.: PCT/EP85/00443
§ 371 Date: May 5, 1986
§ 102(e) Date: May 5, 1986
[87] PCT Pub. No.: WO86/01688
PCT Pub. Date: Mar. 27, 1986

[30] Foreign Application Priority Data

Sep. 7, 1984 [IT] Italy ................................ 67888 A/84

[51] Int. Cl.$^4$ .......................... A23G 9/00; A23G 9/04
[52] U.S. Cl. .................................... 426/565; 426/654
[58] Field of Search ............... 426/565, 566, 567, 570, 426/654

[56] References Cited

U.S. PATENT DOCUMENTS 2,590,077  3/1952  Lolkeman ............................. 99/136
4,251,560  2/1981  Dell et al. ............................. 426/565
4,264,637  4/1981  Braverman ........................... 426/573
4,452,823  6/1984  Connolly ............................. 426/565

FOREIGN PATENT DOCUMENTS 2657489  10/1980  Fed. Rep. of Germany.
1217873  12/1959  France.
2359581  2/1978  France.
2387605  11/1978  France.

OTHER PUBLICATIONS

Food Science and Technology Abstracts No. 77-020P 0364.
Von G. Graele, die starke, (1974).

Primary Examiner—Jeanette Hunter
Attorney, Agent, or Firm—Bernard, Rothwell & Brown

[57] ABSTRACT

Ice cream confection normally in liquid state which is an oil-in-water emulsion containing fats, milk proteins, sweetness and water. The water is made physically and chemically stable by means of a stabilizing and thickening composition of an alginate, a disodium phosphate and a modified starch. The product is made by preparing the emulsion, sterilizing and homogenizing to obtain a product having a viscosity of not greater than 1200 cps. Even without the product has a homogeneously microcrystalline structure after freezing.

13 Claims, No Drawings

ICE-CREAM CONFECTIONERY PRODUCT AND A METHOD FOR ITS MANUFACTURE

The present invention relates to a fluid, edible composition, adapted to be frozen, which may be stored in unfrozen condition for an extended period of time, and which is to be frozen in a refrigerator to give a solid ready-to-eat ice-food product.

Particularly the invention relates to a product having a fat content of 10 to 18% wt typical of products defined as ice-cream as distinct from ice-milk, sherbet and ice.

Ice-cream is an edible composition comprising milk, cream or water, sweetening agents, flavourings, binders and emulsifiers, which is to be brought to a solid or semi-solid state by freezing.

It is conventional in ice-cream preparation to cause air to be incorporated in the composition during or before freezing, in order to obtain a peculiar, pleasant mouth feeling when the frozen composition is eaten. Owing to the presence of small air bubbles, the ice-cream melts rapidly in the mouth giving a pleasant freshness fealing to the consumer and avoiding an undesirable too strong cooling of the mouth and teeth.

Ice-cream is sold in a ready-to-eat condition, that is, it is stored in packaged or open condition under refrigeration and is directly taken out of the refrigerated environment just before being eaten. When ice cream is bought, the consumer has therefore to act so as to avoid thawing or melting of the packaged frozen composition, since upon thawing, a subsequent freezing would lead to a substantial change in the consistency of the product, thereby loosing the typical physical and organoleptic properties thereof. Particularly in summer time is difficult to avoid thawing on the way from the refrigerating apparatus the market place to the domestic refrigerator.

From DE-PS No. 26 57 489 it is known a package including a unfrozen edible composition to be frozed by the final user, which may be stored or carried at room temperature withouth need of a refrigerating apparatus. Said package comprises a casing for the unfrozen mass with a lid and a sealing foil which is germ and liquid tight; a stick being embedded in the edible mass, whereby upon freezing the composition may be eaten as "ice on a stick".

In DE-PS No. 23 29 816 there is disclosed a ice-composition comprising a zone A and an adjacent fat containing solid zone B wherein zone A consists of a frozen aqueous composition of an edible mass and zone B consists of a homogeneous edible fat dispersion including fat and a sugar containing acqueous syrup. The edible composition A includes a dispersed gaseous phase, whereas the fat dispersion B, surrounding zone A, contains fat homogeneous dispersed in the syrup and preferably does not contain a dispersed gaseous phase. Inverted sugar may be used to prepare zone B.

From FR-B No. 2,359,58 is known an ice cream including sucrose and inverted sugar which however is to be eaten upon having been beaten and whipped in a ice-cream freezer.

From U.S. Pat. No. 4,264,637 it is known an edible composition in the form of an aqueous gel, adapted to be frozen, which is free of butyric fat, having a pudding consistency at room temperature.

The composition contains activated or peptized microcrystalline cellulose with carboxymethyl cellulose and/or alginate, and/or xanthan gum and/or modified starch. Such product, which needs to include a preservative, has a chewy consistency when frozen which is far from the creamy consistency of conventional ice-cream.

The object of the present invention is to provide a fluid edible composition, which can be caused to solidify by freezing without mechanical beating to incorporate air, which does not present ice crystals perceptible to the consumer and having a fat content of conventional ice cream and also presenting organoleptic properties and texture similar to those of conventional aerated ice-creams.

A further object of the present invention is to provide a product which is free from preservatives, which can be kept in the liquid state for a prolonged period of time, even at ambient temperatures, when packaged under sterile conditions, and which is then stable both physically and chemically.

These objects are achieved by means of a product of the type specified in the preamble of the main claim, characterised in that it can be made by the steps of:
(a) preparing an oil-in-water emulsion at a temperature of 55° to 65° C., comprising with reference to the weight of the emulsion:
   of the order of 10 to 18% by weight of edible fats,
   of the order of 1 to 5% by weight of milk proteins,
   up to 32% by weight of sweeteners selected from the group of lactose, sucrose, fructose and mixture thereof,
   of the order of 0.1 to 1.6% by weight of a stabilizing and thickening composition including a salt which acts as a protein stabilizer, a gelling agent constituted by an alkali metal alginate, and a thickening agent selected from the group of chemically modified starches,
   a quantity of liquid and/or solid flavourings, sufficient to give the desired taste,
   the balance to 100 being constituted by the aqueous phase,
(b) sterilising the emulsion at a temperature of 140° to 150° C. for a period of 15 to 2 seconds,
(c) homogenizing the sterilised emulsion at a temperature of 80° to 90° C. and a pressure of 70 to 200 bars, so as to give a product having a viscosity no greater than 1200 cPs, (measured at 20° C., Brookfield viscosimeter) and
(d) cooling the product obtained for its subsequent packaging under aseptic conditions.

In the product according to the invention, the fat phase may be constituted both by butyric fats and a mixture of butyric fats and vegetable fats. The butyric fats are preferably provided by the use of whole milk and cream in respective quantities of 20 to 45% by weight and 15 to 40% by weight, with reference to the weight of the emulsion. However, the desired content of butyric fats could also be provided by the use of cow's butter. The whole milk constitutes a basic element of the emulsion since it acts both as a solvent for the ingredients and base element for the change of state. Furthermore, the milk, which forms the continuous phase of the emulsion, contributes to the protein content and to the lactose present in the emulsion. In addition, the cream contributes to the fat phase, the protein content and the lactose content, completes the aqueous and the lactose content, completes the aqueous phase, and also adds to the taste. Naturally, the fat content of the emulsion could be adjusted by the addition of water to the emulsion itself.

When vegetable fats are used they are preferably chosen from oils having a melting point between 30° and 60° C., such as, for example, coconut oil, palm oil and palm nut oil. Among these, fractionated coconut oil, that is the high melting fraction of coconut oil, is preferred, mainly because of its organoleptic characteristics. In this case, the ratio by weight of the butyric fats to the vegetable fats is preferably kept between 1:1 and 2:1.

By way of a sweetener, in addition to the lactose, the emulsion generally also contains a suitable quantity of a sugar constituted by sucrose and/or fructose. The use of fructose is particularly advantageous in that, by virtue of its low molecular weight, it lowers the freezing temperature of the emulsion. Fructose is preferably used in quantities of 3 to 10% by weight of the emulsion. Moreover, the desired sugar content could be completed by the use of condensed milk which also contributes, of course, to the protein content of the emulsion.

A further subject of the present invention is a thickening and stabilising composition for the preparation of the ice-cream food product having the characteristics mentioned above, this composition comprising a chemically modified starch, an alkali metal alginate, and a salt as a protein stabilizer. The stabilising and thickening composition preferably includes 0.6 to 20 parts by weight of protein stabilizer salt and 6 to 300 parts by weight of alginate, per 100 parts of modified starch. The preferred modified starch used is a starch acetate with adipic cross-linking (starch No. 14). The protein stabilizer salt is preferably a disodium or dipotassium phosphate.

With reference to the weight of the emulsion which constitutes the confectionery product according to the invention, the protein stabilizer salt is preferably used in quantities of 0.01 to 0.02% by weight, the alginate in quantities of 0.1 to 0.3% by weight, and the modified starch in quantities of 0.1 to 1.5% by weight.

The preparation of the emulsion is carried out at a typical temperature of 55° to 65° C. and preferably at 60° C., such that the oil phase is liquid. The preparation is carried out in an emulsifier, for example of the agitator type rotated at about 1400 revolutions per minute, in accordance with conventional methods for the preparation of emulsions. Milk preheated to about 60° C. is introduced into the emulsifier, after which all the premixed dry soluble ingredients are added. The fat as such, when used, is generally introduced last in the molten state.

The sterilisation step (b) is preferably carried out continuously by means of a scraped-surface heat exchanger (S.S.H.E.). In this step, the emulsion is kept at a temperature of 140° to 150° C. for a period of 15 to 2 seconds under a hydraulic pressure sufficient to prevent evaporation of the aqueous phase. It is preferable to carry out a homogenisation upstream of the sterilisation step (b), at a temperature of 55° to 65° C. and a pressure of 75 to 100 bars. Preferably, for this homogenisation, a two-stage homogeniser is used in which the homogenisation in the first stage is carried out at a pressure of 75 to 100 bars and in the second stage at a pressure of 25 to 30 bars.

After sterilisation, the emulsion is cooled quickly to the temperature of step (c), that is 80° to 90° C. This cooling may be effected continuously with the use of a S.S.H.E. connected to the outlet of the sterilisation S.S.H.E. The final homogenisation step (c) is carried out at a pressure of 70 to 200 bars. Preferably, a two-stage homogeniser is also used in this case, in which the homogenisation is carried out in the first stage at a preferred pressure of 125 to 150 bars and in the second stage at a pressure of 25 to 30 bars. With the final homogenisation, the viscosity of the emulsion is adjusted to a value not greater than 1200 cPs measured with a Brookfield RVT viscosimeter with a No. 2 rotor at 50 rpm and at 20° C. Preferably the viscosity is adjusted with the final homogenisation to a value of from 125 to 350 cPs measured in the above conditions.

After the final homogenisation step (c), the emulsion is cooled to a temperature of 35° to 40° C. by means of a cooling S.S.H.E. and is then fed to a storage tank in which it is kept under slight agitation, for subsequent packaging under aseptic conditions. Naturally, all the operation carried out downstream of the sterilisation step are carried out under aseptic conditions.

The relatively low value of the viscosity of the product according to the invention constitutes an important characteristic. In fact, it is found that with a viscosity value within the limits indicated above, the formation of the desired microcrystalline structure is facilitated in the frozen product. The product is generally packaged in aseptic containers having a preferred volume of about 75 cc. The freezing point of the product according to the invention is from $-3°$ to $-6°$ C. Preferably, the freezing is carried out by placing the product in an environment with a temperature which is 10° to 15° C. below the freezing point so as to ensure initial subcooling of the product. In fact, in these conditions are found the best characteristics with regard to the microcrystalline structure which is homogeneous and free from ice crystals perceptible by the consumer. The ice crystal dimension obtained upon freezing in the product according to the invention is in the best conditions in the range of 5–35 microns and never exceeds 150 microns. The drop time measured on a product initially at $-20°$ C. and at left room temperature of 23° C., is from 15 to 18 minutes. The product can be kept in the liquid state for more than four months after packaging. Furthermore, it may be subjected to repeated freezing and thawing cycles without this prejudicing the stability of the emulsion and/or the quality of the frozen product when it is ready for eating.

The present invention will now be described in greated detail with reference to the following examples.

EXAMPLE 1

For the preparation of 100 Kg of product, an emulsion is prepared which contains the following ingredients:

| | |
|---|---|
| whole milk | 43.5 Kg |
| cream | 26 Kg |
| sucrose | 21 Kg |
| fructose | 5.3 Kg |
| coffee extract | 3 Kg |
| sodium alginate | 0.12 Kg |
| $Na_2HPO_4$ | 0.015 Kg |
| NaCl | 0.04 Kg |
| starch No.14 | 1 Kg |

The cream used has a butyric fat content of 50% by weight, a protein content of 2% by weight and a lactose content of 2.3% by weight.

The total fat, protein and sugar contents of the emulsion are given in Table 1.

For the preparation of the emulsion, the whole milk is preheated to 60° C. and introduced into the rotary emulsifier which has a speed of 1400 revolutions per minute. The entire preparation of the emulsion is carried out at a temperature of 60° C. The premixed soluble ingredients are then introduced into the emulsifier under agitation and the cream, preheated to bring the fat to the molten state, is added last.

The coffee extract serves as the flavouring of the product and the sodium chloride enhances its taste.

The emulsion is then fed in a continuous system at temperature of 60° C. to a two-stage homogeniser, and is subjected to homogenisation at a pressure of 80 bars in the first stage and 25 bars in the second stage. The homogenised emulsion is preheated in a S.S.H.E. to 110° C. and then fed to a second S.S.H.E. in which the sterilisation is carried out at a temperature of 148° C. for 6 seconds. The flow of sterilised emulsion is subsequently procooled to 85° C. in a S.S.H.E. and then supplied to the second homogenisation stage in which it is kept at a pressure of 130 bars in the first stage and a pressure of 25 bars in the second stage. After cooling in a S.S.H.E. to a temperature of 35° C., the flow of emulsion is supplied to a storage tank and subsequently packaged in aseptic 75 cc containers.

The product obtained has a viscosity of 300 cPs determined by a Brookfield RVT viscosimeter with a No. 2 rotor at 50 rpm and 20° C. immediately after packaging. The viscosity of the product increases slightly with time, but not such as to harm the freezing characteristics of the product.

EXAMPLE 2

100 Kg of product are obtained by preparation of an emulsion comprising the following ingredients:

| | |
|---|---|
| whole milk | 40 Kg |
| cream (Example 1 type) | 26 Kg |
| sucrose | 19.1 Kg |
| sweetened condensed milk | 12.5 Kg |
| milk protein | 1 Kg |
| starch No.14 | 1 Kg |
| sodium alginate | 0.12 Kg |
| NaCl | 0.03 Kg |
| $Na_2HPO_4$ | 0.013 Kg |
| flavourings | 0.270 Kg |

The total fat, protein and sugar contents of the emulsion obtained are given in Table 1.

The method for the preparation of the final product corresponds substantially to that described with reference to Example 1. However, the sterilisation is carried out under slightly gentler conditions at a temperature of 144° C. for 6.5 seconds.

The final product has a Brookfield viscosity as previously defined of about 200 cPs, which increases slightly with time.

EXAMPLE 3

The product according to the invention is prepared in the same manner as described with reference to Example 1, the following ingredients being introduced into the emulsifier:

| | |
|---|---|
| whole milk | 30.7 Kg |
| cream (Example 1 type) | 12 Kg |
| $H_2O$ | 24.5 Kg |
| fractionated coconut oil | 7 Kg |
| sucrose | 10.7 Kg |
| fructose | 8.5 Kg |
| plain chocolate | 3.6 Kg |
| sodium alginate | 0.3 Kg |
| NaCl | 0.02 Kg |
| $Na_2HPO_4$ | 0.01 Kg |
| starch No.14 | 0.2 Kg |
| flavourings | 2.4 Kg |

The total fat, protein and sugar contents of the emulsion are given in Table 1. The product obtained has a Brookfield viscosity as previously defined of about 350 cPs measured immediately after packaging.

In this case also, the product undergoes a slight increase in viscosity with time, but not such as to harm the structure of the frozen product.

TABLE 1

| | Example 1 | Example 2 | Example 3 |
|---|---|---|---|
| Fats (% by weight) | 14.5 | 15.5 | 14.1 |
| Protein (% by weight) | 2.0 | 3.0 | 1.3 |
| Sugar (% by weight) | 28.6 | 26.8 | 20.9 |

I claim:

1. Ice-cream confectionery product which is in a liquid state at ambient temperature and consists of a sterilised oil-in-water emulsion comprising edible fats, milk protein, sweeteners and water, the emulsion being physically and chemically stable and preservable at ambient temperature when packaged under aseptic conditions, having a freezing point of −3° to −6° C., and having a substantially homogeneous microcrystalline structure after freezing, even without beating, the product being prepared by a process comprising the steps of:
   (a) preparing an oil-in-water emulsion at a temperature of 55° to 65° C., comprising with reference to the weight of the emulsion:
   about 10 to 18% by weight of edible fats,
   about 1 to 5% by weight of milk proteins,
   up to 32% by weight of sweeteners selected from the group of lactose, sucrose, fructose and mixtures thereof,
   about 0.1 to 1.6% by weight of a stabilizing and thickening composition consisting essentially of a phosphate salt which acts as a protein stabilizer, a gelling agent constituted by an alkali metal alginate, and a thickening agent selected from the group of chemically modified starches,
   a quantity of ligand and/or solid flavourings sufficient to give the desired taste,
   the balance to 100 being constituted by the aqueous phase,
   (b) sterilising the emulsion at a temperature of 140° to 150° C. for a period of 15 to 2 seconds,
   (c) homogenizing the sterilised emulsion at a temperature of 80° to 90° C. and a pressure of 70 to 200 bars, so as to give a product having a viscosity no greater than 1200 cPs, (measured at 20° C. Brookfield viscosimeter) and
   (d) cooling the product obtained for its subsequent packaging under aseptic conditions.

2. Product according to claim 1, in which the edible fats comprise butyric fats and vegetable fats.

3. Product according to claim 2, in which the ratio by weight of the butyric fats to the vegetable fats is from 1:1 to 2:1.

4. Product according to claim 2, in which the vegetable fats are selected from the group consisting of fractionated coconut oil, palm oil, and palm nut oil, which have a melting point of 30° to 36° C.

5. Product according to claim 1, in which the fats are provided by the use of whole milk and cream in respective quantities of 20 to 45% by weight and 15 to 40% by weight of the emulsion.

6. Product according to claim 1, in which the protein stabilizing salt is a disodium or dipotassium phosphate in quantities of 0.01 to 0.02% by weight, with reference to the weight of the emulsion.

7. Product according to claim 1, in which the modified starch is present in quantities of 0.1 to 1.5% by weight, with reference to the weight of the emulsion.

8. Product according to claim 1, in which the modified starch is a starch acetate with adipic cross-linking.

9. Product according to claim 1, in which the alginate is present in quantities of 0.1 to 0.3% by weight, with reference to the weight of the emulsion.

10. Product according to claim 1, in with the sweeteners include from 3 to 10% by weight of fructose, with reference to the weight of the emulsion.

11. Product according to claim 1, in which step (a) is followed by a stage of homogenisation at a pressure of 75 to 100 bars.

12. Product according to claim 1, having in unfrozen condition a viscosity from 125 to 350 cPs (20° C. Brookfield viscosimeter).

13. Method for the preparation of an ice-cream confectionery product which is in a liquid state at ambient temperature and consists of a sterilised oil-in-water emulsion comprising edible fats, milk protein, sweeteners and water, the emulsion being physically and chemically stable and preservable at ambient temperature when packaged under aseptic conditions, having a freezing point of −3° to −6° C., and having a substantially homogeneous microcrystalline structure after freezing, even without beating, the method comprising the steps of:
 (a) preparing an oil-in-water emulsion at a temperature of 55° to 65° C., comprising with reference to the weight of the emulsion:
  about 10 to 18% by weight of edible fats,
  about 1 to 5% by weight of milk proteins,
  up to 32% by weight of sweeteners selected from the group of lactose, sucrose, fructose and mixtures theroef,
  about 0.1 to 1.6% by weight of a stabilizing and thickening composition consisting essentially of a phosphate salt which acts as a protein stabilizer, a gelling agent constituted by an alkali metal alginate, and a thickening agent selected from the group of chemically modified starches,
  a quantity of liquid and/or solid flavourings sufficient to give the desired taste,
  the balance to 100 being constituted by the aqueous phase,
 (b) sterilising the emulsion at a temperature of 140° to 150° C. for a period of 15 to 2 seconds,
 (c) homogenizing the sterilised emulsion at a temperature of 80° to 90° C. and a pressure of 70 to 200 bars, so as to give a product having a viscosity no greater than 1200 cPs, measured at 20° C., Brookfield viscosimeter and
 (d) cooling the product obtained for its subsequent packaging under sterile conditions.

* * * * *